US012587912B2

(12) United States Patent
Lu et al.

(10) Patent No.: US 12,587,912 B2
(45) Date of Patent: Mar. 24, 2026

(54) METHOD AND SYSTEM FOR DATA TRANSMISSION IN WIRELESS NETWORK

(71) Applicant: ZTE Corporation, Shenzhen (CN)

(72) Inventors: Ting Lu, Shenzhen (CN); Bo Dai, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 303 days.

(21) Appl. No.: 17/592,285

(22) Filed: Feb. 3, 2022

(65) Prior Publication Data

US 2022/0159532 A1 May 19, 2022

Related U.S. Application Data

(63) Continuation of application No. PCT/CN2019/099148, filed on Aug. 3, 2019.

(51) Int. Cl.
*H04W 36/00* (2009.01)
*H04W 68/00* (2009.01)
*H04W 76/27* (2018.01)

(52) U.S. Cl.
CPC ..... *H04W 36/0038* (2013.01); *H04W 68/005* (2013.01); *H04W 76/27* (2018.02)

(58) Field of Classification Search
CPC ..... H04W 76/16; H04W 36/00; H04W 68/02; H04W 8/02; H04W 8/18; H04W 76/20; H04W 76/30
See application file for complete search history.

(56) References Cited

U.S. PATENT DOCUMENTS

| | | | | |
|---|---|---|---|---|
| 12,010,540 | B2 * | 6/2024 | Xiong | H04W 24/10 |
| 2019/0104553 | A1 | 4/2019 | Johansson et al. | |
| 2019/0223221 | A1 | 7/2019 | Johansson et al. | |
| 2019/0261309 | A1 * | 8/2019 | Martin | H04W 76/11 |
| 2020/0288428 | A1 * | 9/2020 | Jin | H04W 76/27 |
| 2020/0413477 | A1 * | 12/2020 | Liu | H04W 68/005 |
| 2021/0037443 | A1 * | 2/2021 | Berggren | H04W 40/22 |
| 2021/0315050 | A1 * | 10/2021 | Rönneke et al. | H04W 76/27 |

FOREIGN PATENT DOCUMENTS

| | | |
|---|---|---|
| CN | 107734639 A | 2/2018 |
| CN | 107770825 A | 3/2018 |
| CN | 109155914 A | 1/2019 |

(Continued)

OTHER PUBLICATIONS

Australian Examination Report issued in corresponding Australian Patent Application No. 2019460300, dated Nov. 28, 2022, 4 pages.

(Continued)

*Primary Examiner* — Iqbal Zaidi
(74) *Attorney, Agent, or Firm* — Perkins Coie LLP

(57) ABSTRACT

Methods, apparatus, and systems for improving data transmission efficiency in a wireless network are described. In one example aspect, a wireless communication method includes receiving, by a signaling node, resume information in a first node that has a suspended connection with a terminal, receiving, by the signaling node, a message associated with the resume request information, from a second node, and instructing, by the signaling node, the first node to provide context information of the terminal directly to the second node.

19 Claims, 13 Drawing Sheets

(56) References Cited

FOREIGN PATENT DOCUMENTS

| CN | 109699050 A | 4/2019 |
| EP | 2426996 A1 | 3/2012 |
| WO | 2018084070 A1 | 5/2018 |

OTHER PUBLICATIONS

Australian notice of acceptance issued in corresponding Australian Patent Application No. 2019460300, dated Oct. 27, 2023, 3 pages.
International Search Report and Written Opinion mailed on Apr. 26, 2020 for International Application No. PCT/CN2019/099148, filed on Aug. 3, 2019 (7 pages).
Ericsson, "Handling UE context for Msg2-based MT UP-EDT," 3GPP TSG-RAN WG2 #106, Reno, Nevada, USA, R2-1906931, 6 pages, May 13-17, 2019.
Huawei et al., "Overall procedure for Msg2 based option," 3GPP TSG-RAN WG2 Meeting #106, Reno, Nevada, USA, R2-1906153, 8 pages, May 13-17, 2019.
Mediatek Inc., "Mobile-terminated Early Data Transmission," 3GPP TSG-RAN WG2 Meeting #104, Spokane, WA, USA, R2-1818210, 5 pages, Nov. 12-16, 2018.
Sierra Wireless, "Efficient and configurable DL EDT," 3GPP TSG RAN WG2 Meeting #104, Spokane, USA, R2-1818164, 3 pages, Nov. 12-16, 2018.
European Search Report for EP Patent Application No. 19940598.6, dated on Jul. 7, 2022, (8 pages).
Ericsson, "Introduction of the light connected mode," 3GPP TSG-RAN WG3 Meeting #93bis, R3-162433, Sophia Antipolis, France, Oct. 10-14, 2016, 9 pages.
Intel, "LS on Light connection," 3GPP TSG RAN WG3 Meeting #93bis, R3-162561, 4 pages.
Chinese Notification to Complete Formalities of Registration issued in CN Patent Application No. 201980100786.5, dated Nov. 19, 2025, 4 pages. English translation included.
Chinese office action issued in CN Patent Application No. 2019801007865, dated Apr. 22, 2025, 21 pages. English translation included.
European Communication pursuant to Article 94(3) EPC issued in EP Patent Application No. 19940598.6, dated Sep. 26, 2024, 8 pages.
Chinese office action issued in CN Patent Application No. 201980100786.5, dated Sep. 2, 2025, 8 pages. English translation included.

* cited by examiner

1000

1010

Receive, by a signaling node, resume information in a first node that has a suspended connection with a terminal

1020

Receive, by the signaling node, a message associated with the resume request information, from a second node

1030

Instruct, by the signaling node, the first node to provide context information of the terminal directly to the second node

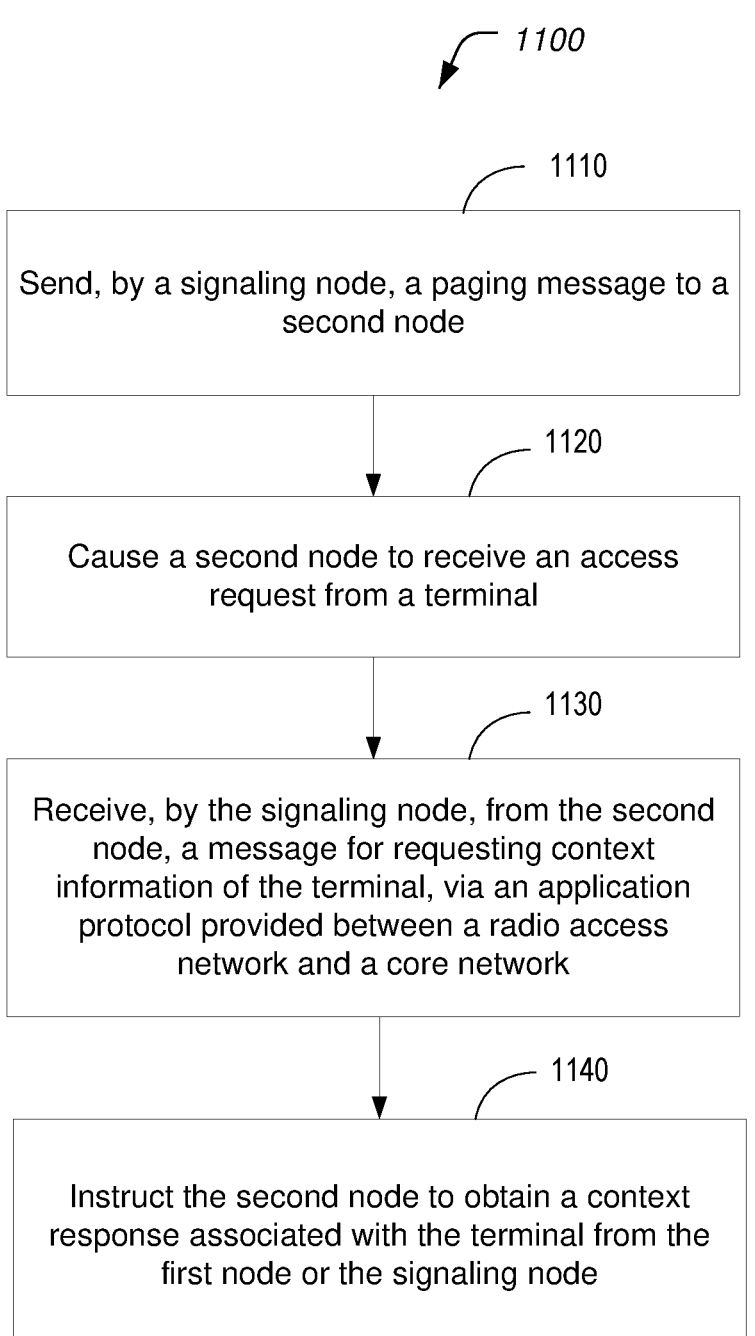

*1100*

1110

Send, by a signaling node, a paging message to a second node

1120

Cause a second node to receive an access request from a terminal

1130

Receive, by the signaling node, from the second node, a message for requesting context information of the terminal, via an application protocol provided between a radio access network and a core network

1140

Instruct the second node to obtain a context response associated with the terminal from the first node or the signaling node

Perform a connection suspend procedure to suspend a connection between a terminal and a first base station

1220

Provide a second base station with a paging message by a mobility management entity

1230

Cause the second base station to obtain context information of the terminal from at least one of the first base station or the mobility management entity

METHOD AND SYSTEM FOR DATA TRANSMISSION IN WIRELESS NETWORK

CROSS-REFERENCE TO RELATED APPLICATIONS

This application is a continuation of International Patent Application No. PCT/CN2019/099148, filed on Aug. 3, 2019, the contents of which are incorporated herein by reference in their entirety.

TECHNICAL FIELD

This document is directed generally to wireless communications.

BACKGROUND

Efforts are currently underway to define next generation wireless communication networks that provide greater deployment flexibility, support for a multitude of devices and services and different technologies for efficient bandwidth utilization. The next generation wireless communication networks are also expected to deploy new core networks that provide additional services and flexibility beyond currently available core networks.

SUMMARY

This document provides techniques for improving data transmission efficiency in a wireless network.

In an example embodiment of the disclosed technology, a wireless communication method is disclosed. The wireless communication method includes receiving, by a signaling node, resume information in a first node that has a suspended connection with a terminal, receiving, by the signaling node, a message associated with the resume request information, from a second node, and instructing, by the signaling node, the first node to provide context information of the terminal directly to the second node.

In another example embodiment of the disclosed technology, a wireless communication method is disclosed. The wireless communication method includes sending, by a signaling node, a paging message to a second node, instructing a second node to receive an access request from a terminal, receiving, by the signaling node, from the second node, a message for requesting context information of the terminal, via an application protocol provided between a radio access network and a core network, and instructing the second node to obtain a context response associated with the terminal from the first node or the signaling node.

In yet another example embodiment of the disclosed technology, a wireless communication method is disclosed. The wireless communication method includes performing a connection suspend procedure to suspend a connection between a terminal and a first base station, providing a second base station with a paging message by a mobility management entity, and causing the second base station to obtain context information of the terminal from at least one of the first base station or the mobility management entity.

In yet another example embodiment of the disclosed technology, the above-described methods are embodied in the form of processor-executable code and stored in a computer-readable program medium.

In yet another example embodiment of the disclosed technology, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 11 is a flow diagram illustrating another example of a wireless communication method based on some embodiments of the disclosed technology.

DETAILED DESCRIPTION

Figure 1:
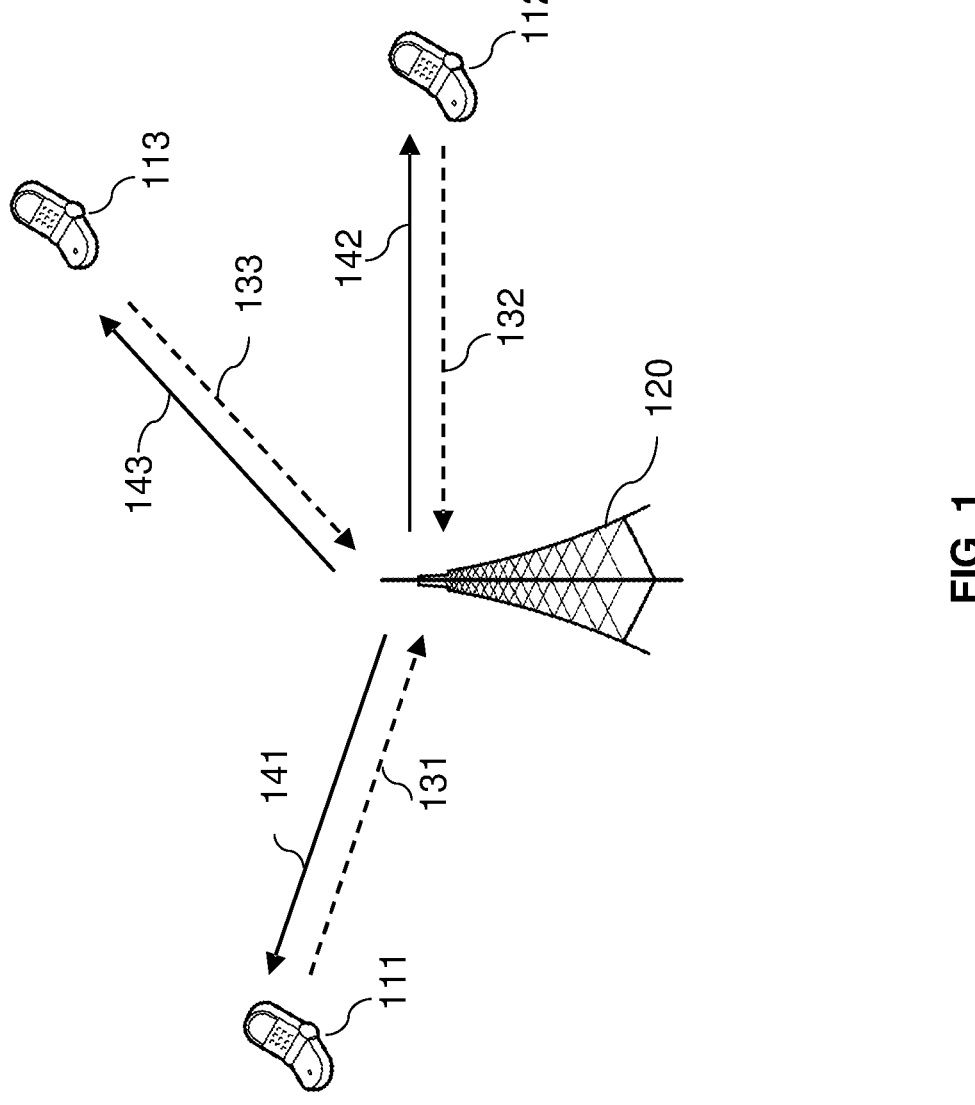
FIG. 1 shows an example of a wireless communication system.

FIG. 1 shows an example of a wireless communication system (e.g., an LTE, 5G New Radio (NR) cellular network) that includes a radio access node 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

The R15 Internet of Things (R15 IoT) standard (e.g., Narrow Band Internet of Things [NB-IoT]/enhanced Machine-Type Communication [eMTC]) supports efficient uplink packet transmission such as Mobile Originated Early Data Transmission (MO-EDT). For example, a terminal can directly encapsulate uplink small data in the uplink signaling in a random-access process such that the terminal and the network complete conflict resolution and the data transmission is considered successful. There is no need for a wireless connection between the terminal and the network, and the terminal remains idle at all times.

In the discussion of the R16 IoT standard, a new Mobile-Terminated Early Data Transmission (MT-EDT) function was introduced, which is mainly for the IoT applications or services in which downlink data transmission may be dominant. To further improve transmission efficiency, the following basic MT-EDT processes are being discussed in the standard.

Figure 2:
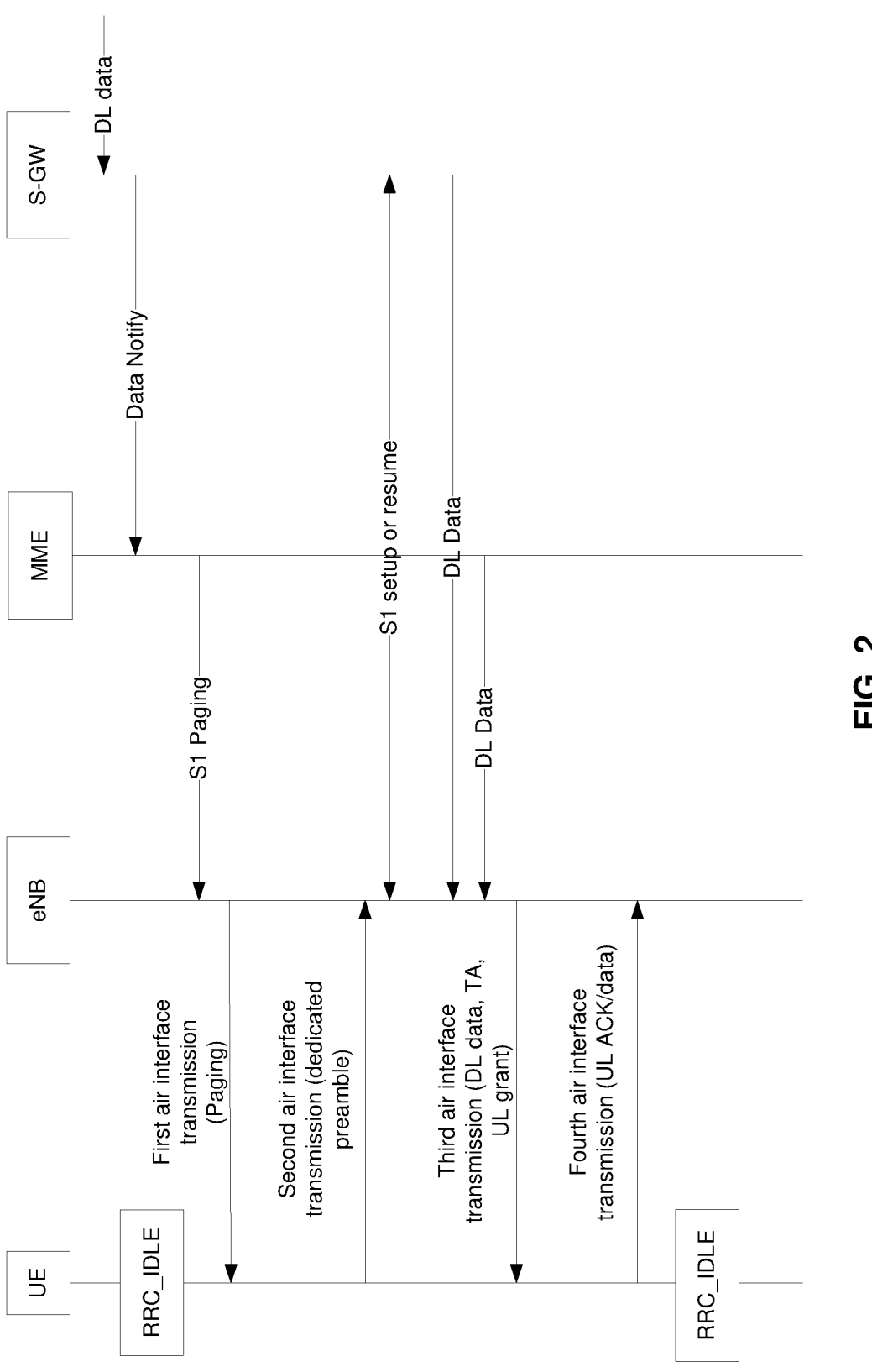
FIG. 2 is a flowchart illustrating an example process performed by components of a communication system.

FIG. 2 is a flowchart illustrating an example process performed by components of a communication system.

After receiving a paging message sent by the core network, the base station determines that the MT-EDT process needs to be triggered, and the base station sends a first air interface transmission to the terminal. In some implementations, the first air interface transmission may include a paging message, and the paging message carries the terminal-specific (e.g., contention free) random access resources and related information for identifying terminal-specific Radio Network Temporary Identifiers (RNTIs) for uplink and downlink transmission of terminals. In some implementations, RNTIs are used to differentiate/identify a connected UE in the cell, a specific radio channel, a group of UEs in case of paging, a group of UEs for which power control is issued by the eNB, system information transmitted for all the UEs.

The terminal learns that the terminal-specific random access resource and sends a second air interface transmission according to the information about the terminal-specific random access resource. In some implementations, the terminal-specific random access resource may include a contention free random access resource. In this case, the terminal uses the contention free random access resource to send a random access preamble, which can minimize conflict between terminals.

After receiving the random access preamble sent by the terminal on the contention free random access resource, the base station triggers the relevant process to request the core network for downlink data of the terminal, and then the base station sends a third air interface transmission to the terminal. In some implementations, the third air interface transmission includes the downlink data. The downlink transmission is scrambled by the terminal dedicated RNTI. The downlink transmission may further include updated timing advance information for the terminal.

After receiving the downlink data, the terminal sends a fourth air interface transmission to the base station. In some implementations, the uplink transmission is scrambled by the terminal dedicated RNTI. The uplink transmission may include an uplink physical layer acknowledgement of the terminal for the received downlink data, or a media access control (MAC) layer acknowledgement, or a radio resource control (RRC) layer acknowledgement, or an application layer acknowledgement.

In the above basic procedure, for the uplink transmission, before the third air interface transmission, the base station needs to acquire context information associated with the terminal, so as to encrypt the downlink data and then transmit the encrypted downlink data over the air interface. However, there may be a case where the terminal suspends the connection at the first base station, in which the context of the terminal is stored, and the first base station assigns a recovery ID (ResumeID) to the terminal to identify the stored context of the terminal. The terminal then moves to the second base station in cases where the second base station is in the same core network coverage as the first base station. Upon receipt of the downlink data for the terminal, the core network determines that the terminal is in an idle state and initiates paging to the terminal, and then the core network may send a paging message to multiple base stations (e.g., the first base station and the second base station) whose coverage is available. The first base station and the second base station respectively trigger an MT-EDT procedure for the terminal.

However, only the second base station detects the dedicated random access preamble of the terminal on the dedicated random access resource allocated for the terminal. The second base station may obtain System Architecture Evolution (SAE)-Temporary Mobile Subscriber Identity (S-TMSI) identification information of the terminal and the address information of the core network registered by the terminal (e.g., the core network that sends the paging message to the terminal/the base station), and the second base station may initiate the interface setup or resumption to the core network and obtains downlink data for the terminal. However, since the second base station does not have the context information of the terminal and the ResumeID for identifying the context, and the address information of the first base station storing the terminal context information, the second base station can neither acquire the terminal context nor encrypt the downlink data.

Figure 3:
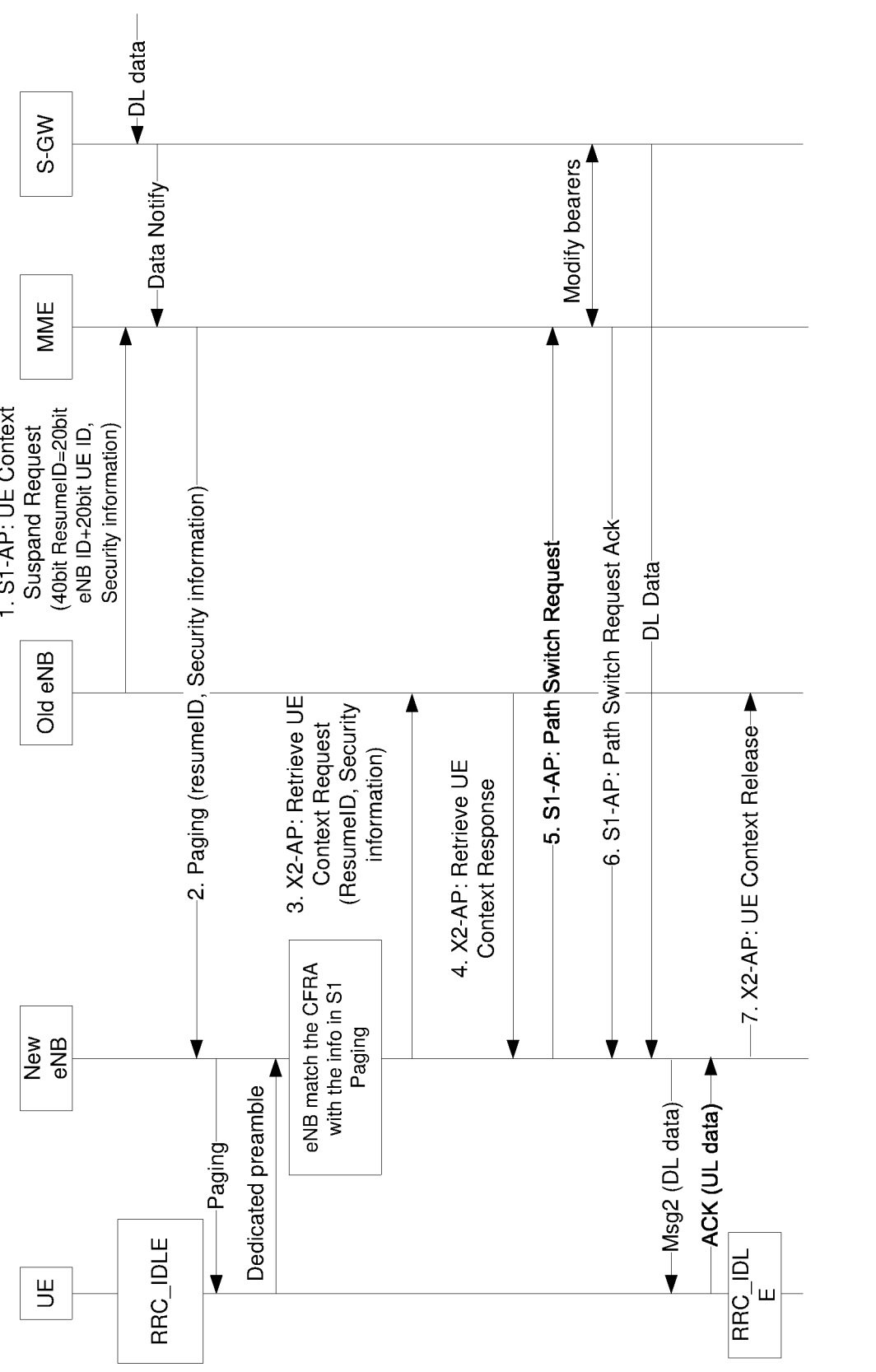
FIG. 3 is a flowchart illustrating another example process performed by components of a communication system.

FIG. 3 is a flowchart illustrating another example process performed by components of a communication system.

In an embodiment of the disclosed technology, in case the last connection is suspended, the first base station allocates the ResumeID to the terminal, and the ResumeID and the necessary security information can be passed to the core network through the uplink signaling of between the base station and the core network and stored by the core network. Here, the first base station may also pass the security information in order to later determine that the second base station is a trusted base station. During the next paging process, the core network carries the ResumeID and the security information in the paging message to one or more second base stations. After one of the second base station detects the dedicated random access preamble of the terminal, the second base station learns the first base station address information based on the ResumeID and the security information. Then, using the existing inter-base station context retrieval procedure, the ResumeID and the security information are provided to the first base station, and then the context information of the terminal is obtained from the first base station.

In some situations, the access stratum (AS)-layer terminal context-related information needs to be sent to the core network and stored in the core network. In addition, as the core network may send a paging message to multiple base stations when the paging message is sent, in the next paging process, the core network needs to send the context information associated with the terminal to multiple base stations in the paging area, which may cause a large signaling overhead.

Figure 4:
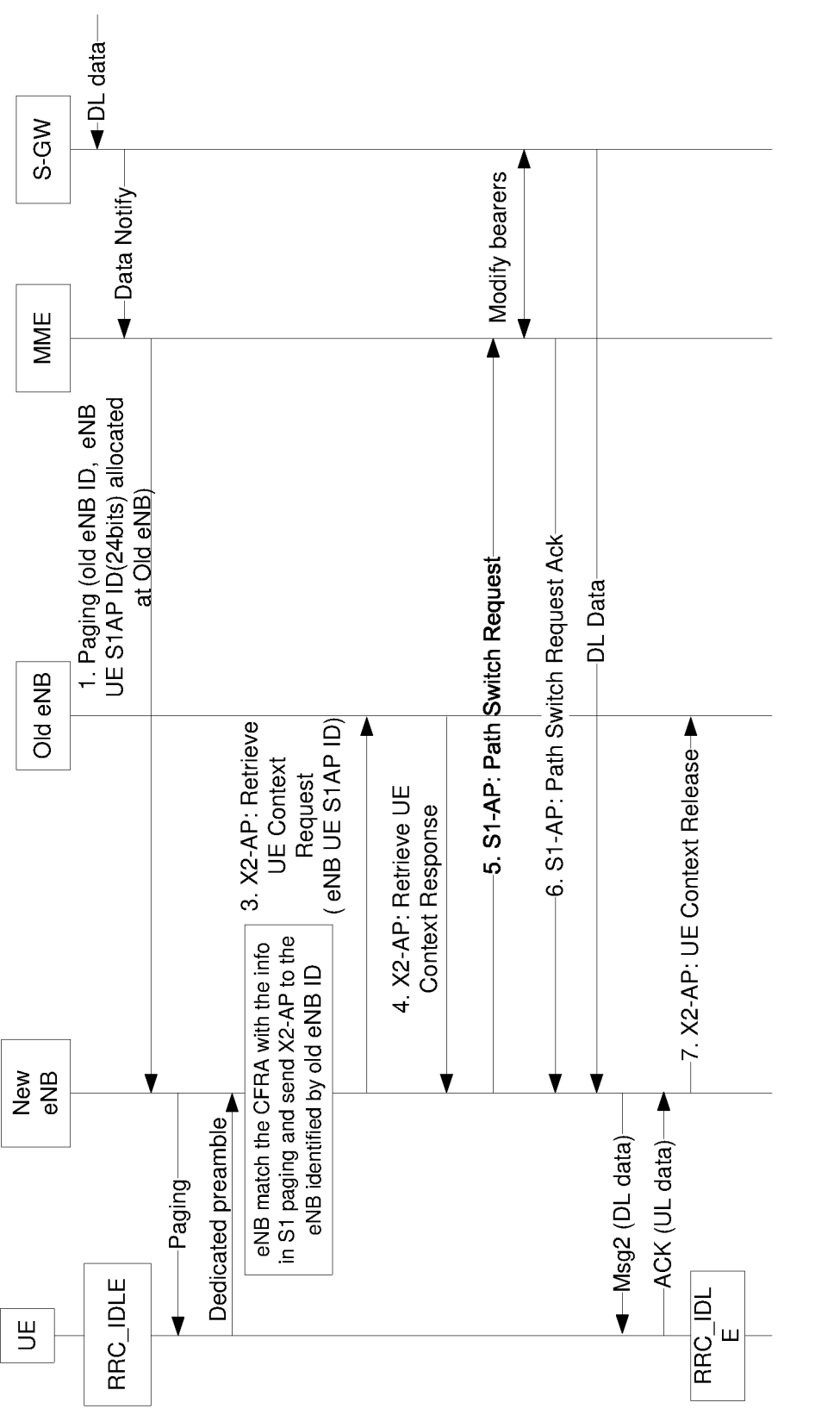
FIG. 4 is a flowchart illustrating yet another example process performed by components of a communication system.

FIG. 4 is a flowchart illustrating yet another example process performed by components of a communication system.

In another embodiment of the disclosed technology, in order to avoid transmitting the AS layer information to the mobility management entity (MME) and storing it in the MME, it is also possible to indirectly identify the terminal context by using the base station—core network interface identifier eNB UE S1 Application Protocol (S1AP) ID assigned by the first base station to the terminal during the last connection. When receiving the downlink data for the terminal, the MME can obtain information about the first base station where the terminal last connected, including the eNB ID of the first base station and the eNB UE S1AP ID. The MME may carry the information in the paging message to the second base station. After the second base station detects the dedicated random access preamble of the terminal, the second base station may trigger an inter-base station terminal context retrieval procedure to the first base station according to the eNB ID of the first base station, and provide the first base station with the eNB UE S1AP ID information, so that the first base station searches for the context information of the terminal according to the information and response to the second base station.

In some implementations, S1AP provides the signaling service between an evolved terrestrial radio access network (E-UTRAN) and an evolved packet core (EPC) that is required to fulfil the S1AP functions. S1AP services are divided into two groups: Non UE-associated services are related to the whole S1 interface instance between the eNB and MME utilizing a non UE-associated signaling connection; and UE-associated services are related to one UE. S1AP functions that provide these services are associated with a UE-associated signaling connection that is maintained for the UE.

Figure 5:
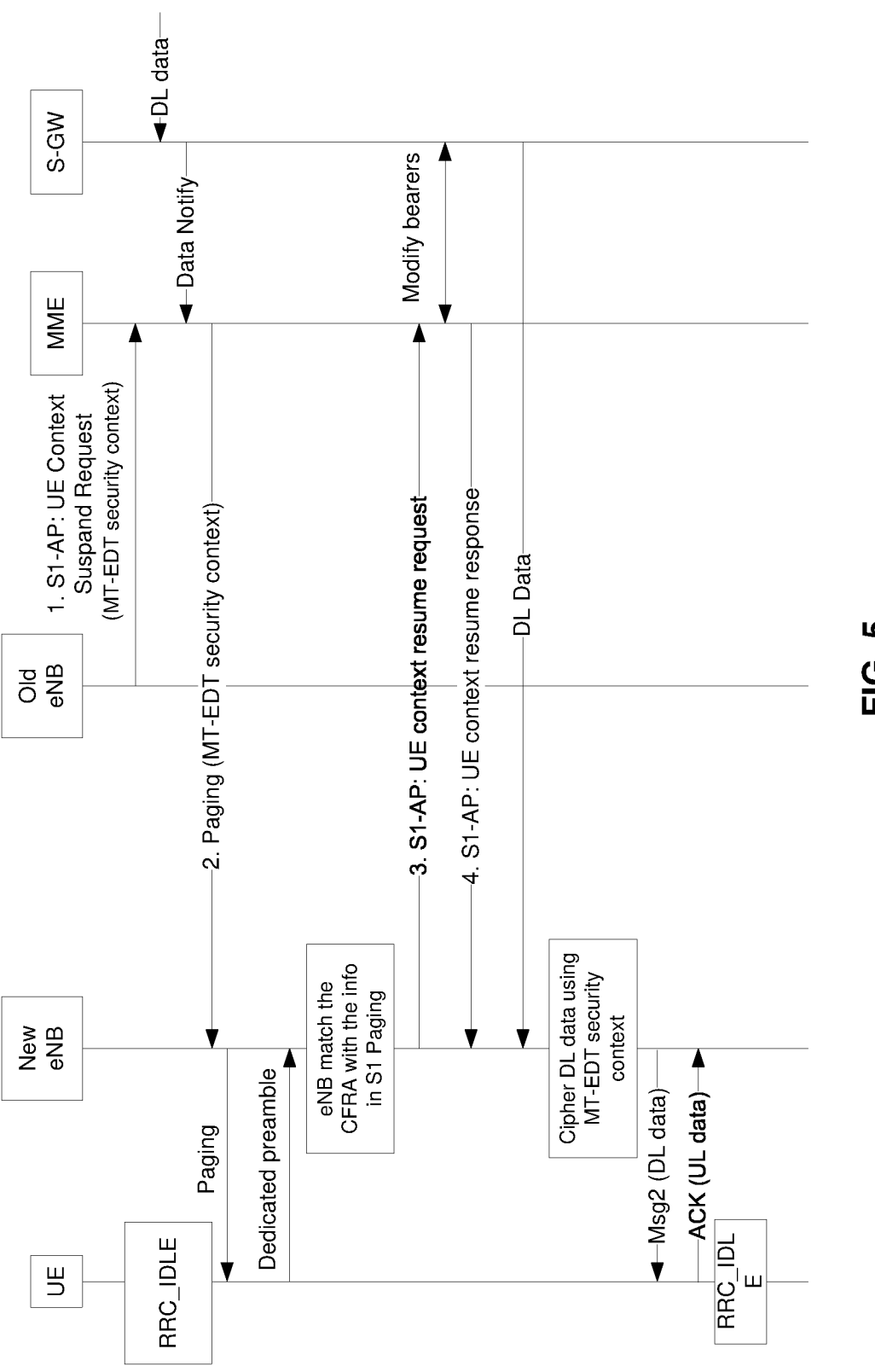
FIG. 5 is a flowchart illustrating yet another example process performed by components of a communication system.

FIG. 5 is a flowchart illustrating yet another example process performed by components of a communication system.

The example processes discussed with reference to FIGS. 3 and 4 need to trigger a terminal context retrieval procedure between base stations, where the first base station needs to send a complete terminal context to the second base station. In order to avoid the above overhead, and considering that only part of the context information is needed to complete the data encryption operation, it is possible to define a new partial context, including only the security key related information. When the last connection is suspended, the first base station constructs the partial context, and carries it to the core network in the uplink signaling of the base station and the core network interface suspension process, and stores it in the core network. During the next paging process, the core network carries the partial context in the paging message to the second base station. After the second base station detects the dedicated random access preamble of the terminal, the second base station acquires the downlink data of the terminal from the core network, and directly uses the partial context to encrypt the downlink data and transmit the data to the terminal through the air interface.

This example process also needs to send the AS layer terminal context related information to the core network and store it in the core network, and considering that the core network may send page messages to multiple base stations, storing and transmitting this partial context will cause a large overhead in the interface between base station and core network.

In the example processes discussed with reference to FIGS. 3-5, paging messages on the interface between the base station and the core network need to carry terminal context-related information, and the information may be transmitted to multiple target base stations. In some implementations, only one target base station receives the dedicated random access preamble of the terminal, and only this target base station needs to initiate the terminal context retrieval procedure, so the terminal context information transmitted to the multiple base stations might cause unnecessary signaling overhead.

Figure 6:
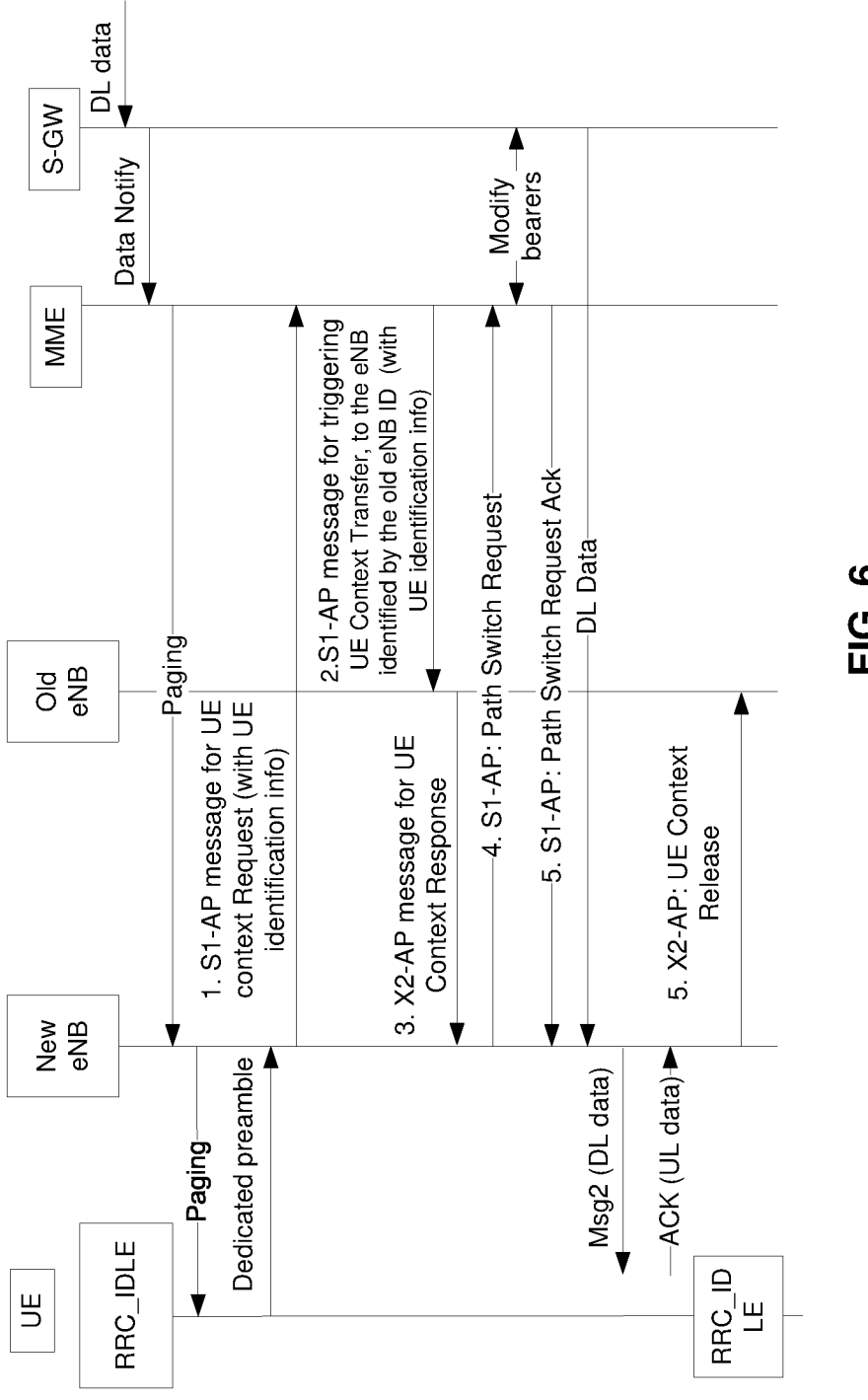
FIG. 6 is an example flow chart of acquiring a terminal context between different base stations based on a new base station request, a core network notification, and an old base station response, based on some embodiments of the disclosed technology.

In an embodiment of the disclosed technology, a flow for acquiring the terminal context between different base stations is based on a new base station request, a core network notification, and an old base station response (See FIG. 6). The paging message between the base station and the core network does not need to be enhanced, and the new base station requests the terminal context and/or the security related information from the core network only after receiving the dedicated random access preamble sent by the terminal, and the core network request the old base station to send the terminal context to the new base station.

Figure 7:
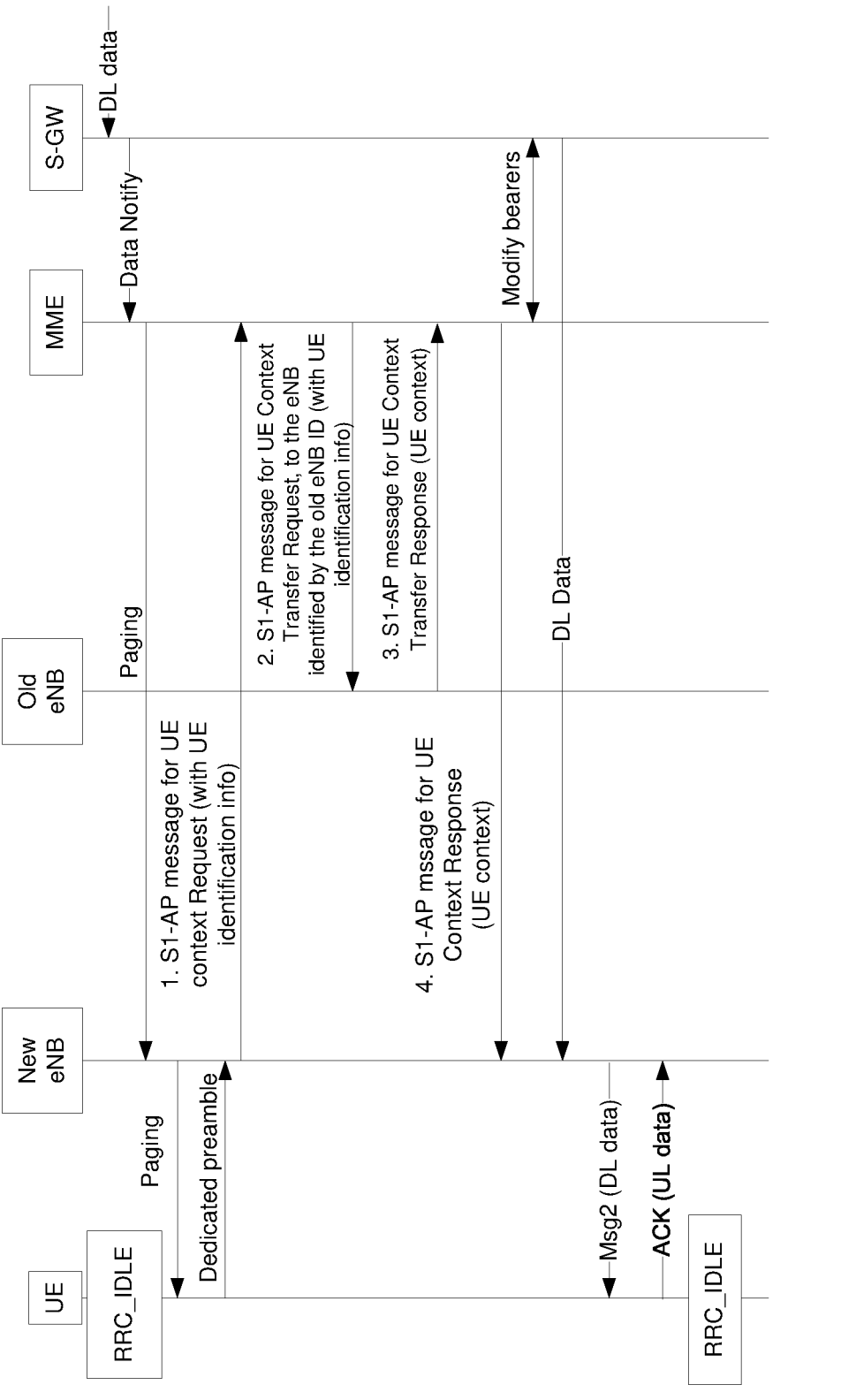
FIG. 7 is a flow chart of obtaining a terminal context between different base stations based on a new base station request and a core network response, based on some embodiments of the disclosed technology.

In another embodiment of the disclosed technology, a flow for acquiring the terminal context between different base stations is based on the new base station request and the core network response (See FIG. 7). The paging message between the base station and the core network does not need to be enhanced. The new base station requests the terminal context and/or the security related information from the core network only after receiving the dedicated random access preamble sent by the terminal. The terminal context is acquired from the old base station and sent by the core network to the new base station.

In some embodiments of the disclosed technology, the core network is configured to carry the terminal context-related information in the paging, without storing the AS context in the core network. This example process can also avoid sending the same paging message to multiple base stations.

FIG. 6 is an example flow chart of acquiring a terminal context between different base stations based on a new base station request, a core network notification, and an old base station response, based on some embodiments of the disclosed technology.

The terminal suspends the connection from a first base station (old base station) before moving to a second base station (new base station). After receiving a paging message sent by the core network, the new base station determines that the MT-EDT process needs to be triggered, and the new base station sends the first air interface transmission (e.g., paging message) to the terminal through the air interface, and the paging message carries the terminal-specific (e.g., contention free) random access resources and related information for identifying a terminal-specific RNTI for uplink and downlink transmission of the terminal.

The terminal learns the contention free random access resources from the information about contention free random access resources. In some embodiments of the disclosed technology, the terminal uses contention free random access resources to send random access preambles.

After receiving the random access preamble sent by the terminal on the contention free random access resource, the new base station discovers, based on the terminal identification, e.g., NAS identifier, that the context associated with the terminal is not stored, and the new base station triggers the following procedure to acquire downlink data from the core network:

1. The new base station can know, based on the page message received, the MME information registered by the terminal, and the new base station sends the S1 interface uplink message to the MME for requesting the terminal context. The uplink message of the S1 interface can be a new S1-AP message, or it can also make use of the existing S1-AP message. The message contains the terminal identity, which can be the eNB UE S1AP ID/MME UE S1AP ID interface information pair, or the terminal identity S-TMSI. In some implementations, when using an existing S1 interface uplink message, a category 2 (class 2) message, which is a message sent in an unacknowledged mode, such as eNB DIRECT INFORMATION TRANSFER or eNB TRANS-FER MESSAGEs, may be reused or optimized.

2. The MME receives the S1 interface terminal context request message, and finds, based on the terminal identifier, the old base station information of the terminal context, and the MME sends an S1 interface downlink message to the old base station to trigger terminal context transfer. The down-link message of the S1 interface may be a new S1-AP message, or may use an existing S1-AP message. The message carries the terminal identifier and the eNB ID of the new base station. When using the existing S1 interface uplink message, a class 2 (class 2) message, which is a message sent in an unacknowledgment mode, such as the MME DIRECT INFORMATION TRANSFER or MME CONFIGURATION TRANSFER message, may be reused or optimized.

3. After receiving a downlink message from the S1 interface sent by the MME to request transferring the terminal context, the old base station obtains, based on the terminal identification match, the context information of the terminal. The old base station then provides the context information of the terminal to the new base station through the X2 interface, using the address information, e.g., eNB ID of the new base station provided by the MME. The old base station can use the new X2-AP interface message, or they can reuse or optimize existing UE CONTEXT RESPONSE messages to do this.

FIG. 7 is a flow chart of obtaining a terminal context between different base stations based on a new base station request and a core network response, based on some embodiments of the disclosed technology.

The terminal suspends the connection from the first base station (old base station) before moving to the second base station (new base station). After receiving the paging message sent by the core network, the new base station deter-mines that the MT-EDT process needs to be triggered, and the new base station sends the first air interface transmission (e.g., paging message) to the terminal through the air inter-face, and the paging message carries the terminal-specific (e.g., contention free) random access resources and related information for identifying a terminal-specific RNTI for uplink and downlink transmission of the terminal.

The terminal learns the contention free random access resources from the information about contention free ran-dom access resources, i.e. uses contention free random access resources to send random access preambles.

After receiving the random access preamble sent by the terminal on the contention free random access resource, the new base station discovers that the context associated with the terminal is not stored according to the terminal NAS identifier, and the new base station triggers the following procedure to acquire downlink data from the core network.

1. The new base station can know the MME information registered by the terminal according to the page message received, and the new base station sends the S1 interface uplink message to the MME for requesting the terminal context. The uplink message of the S1 interface can be a new S1-AP message, or it can also make use of the existing S1-AP message. The message contains the terminal identity, which can be the eNB UE S1AP ID/MME UE S1AP ID identification pair, or the terminal identity S-TMSI. When using an existing S1 interface uplink message, a category 2 (class 2) message, which is a message sent in unacknowl-edged mode, such as eNB DIRECT INFORMATION TRANSFER or eNB TRANSFER MESSAGEs, may be reused or optimized.

2. The MME receives the S1 interface terminal context request message, and, based on the terminal identifier, searches for the old base station information which stores the terminal context, and the MME sends an S1 interface downlink message to the old base station for requesting transfer of the terminal context. The downlink message of the S1 interface may be a new S1-AP message, or may use an existing S1-AP message. The message carries a terminal identifier, and the terminal initiates a new cell ID for dedicated random access.

3. The old base station receives the UE context request message sent by MME, finds the context information of the terminal, the old base station sends the S1 interface uplink message to the core network, and carries the terminal context information. In some implementations, step 2 and step 3 can use a pair of class 1 messages that contain requests and responses.

4. Upon receiving the terminal context message, the core network sends an S1 interface downlink message to the new base station and transmits the terminal context message to the new base station. In some implementations, the new base station may then send an S1 interface uplink message to the core network, to confirm that the terminal context informa-tion has been received. The S1 interface downlink message may be a new S1-AP message, or may use an existing S1-AP message. When using the existing S1 interface downlink message, the class 2 message can be used. In some imple-mentations, the message sent in the acknowledgment mode may include reusing or optimizing the MME DIRECT INFORMATION TRANSFER or MME CONFIGURA-TION TRANSFER message.

In some implementations, steps 1 and 4 can also use a pair of class 1 messages containing requests and responses. For example, steps 1 and 4 may also reuse or optimize the ENB CONFIGURATION UPDATE and ENB CONFIGURA-TION UPDATE ACKNOWLEDGE messages, or the UE RADIO CAPABILITY MATCH REQUEST and UE RADIO CAPABILITY MATCH RESPONSE messages.

Figure 8:
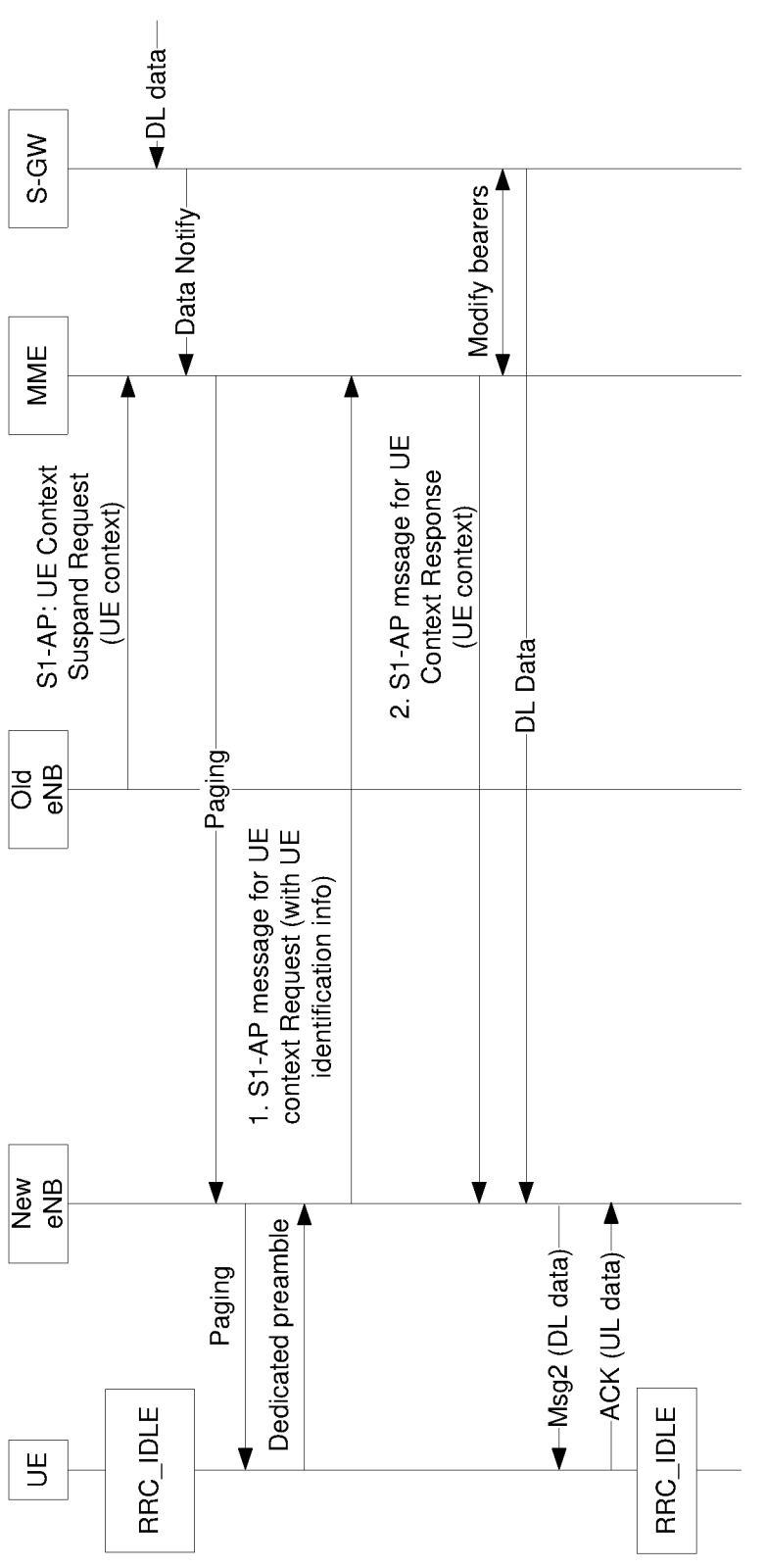
FIG. 8 is a flowchart illustrating an example process performed by components of a communication system implemented based on some embodiments of the disclosed technology.

FIG. 8 is a flowchart illustrating an example process performed by components of a communication system implemented based on some embodiments of the disclosed technology.

In another embodiment of the disclosed technology, the old base station may send the terminal context to the core network and store it in the core network when the last connection was suspended. In this way, when the MME receives the S1 interface terminal context request message sent by the new base station, the MME can directly find the stored terminal context information according to the termi-nal identifier, and then send the S1 interface downlink message to the new base station, and deliver the terminal context message to the new base station. The message flow is shown in FIG. 8.

This message flow also needs to send AS layer terminal context related information to the core network and store it in the core network. However, this message flow can avoid the situation that the paging message on the interface between the base station and the core network needs to carry the terminal context information, and such information may be transmitted to multiple target base stations.

Figure 9:
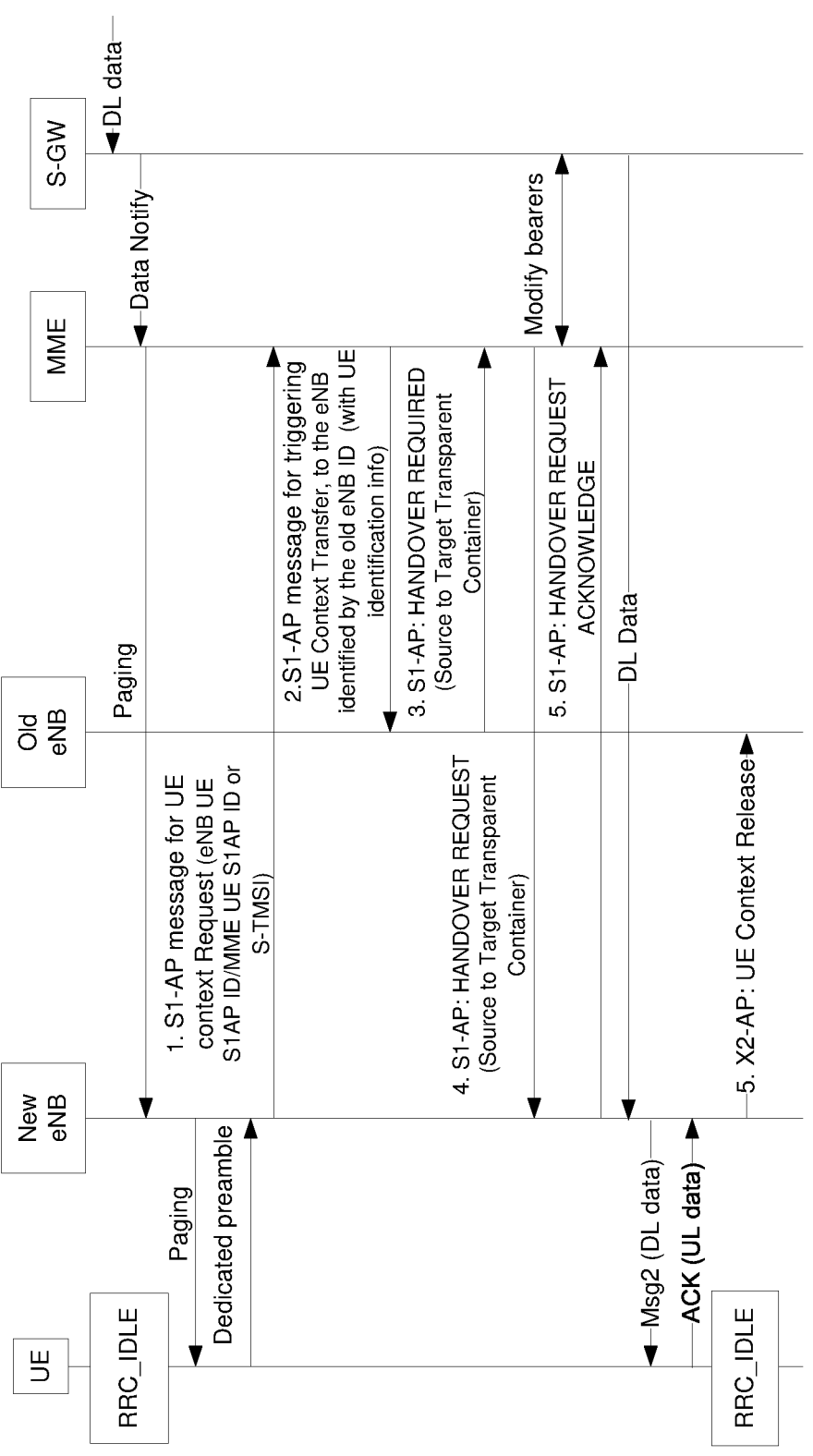
FIG. 9 is a flowchart illustrating another example process performed by components of a communication system implemented based on some embodiments of the disclosed technology.

FIG. 9 is a flowchart illustrating another example process performed by components of a communication system implemented based on some embodiments of the disclosed technology.

As shown in FIG. 7, a terminal context between different base stations may be obtained based on a new base station request and a core network response, based on an embodiment of the disclosed technology. In another embodiment of the disclosed technology, the process by which the core network requests the terminal context from the old base station and passes it to the new base station can be implemented with reference to the inter-base station handover procedure. The message flow is shown in FIG. 9.

In some implementations, terminal context information can be placed in the UE History Information Unit in the Source eNB to Target eNB Container Transparent Information Unit, carried in the optimized handover. The required message is passed from the old base station to the core network, and then carried from the core network to the new base station in the optimized handover request message, which can send the optimized handover request acknowledge message to the MME for confirmation.

Figure 10:
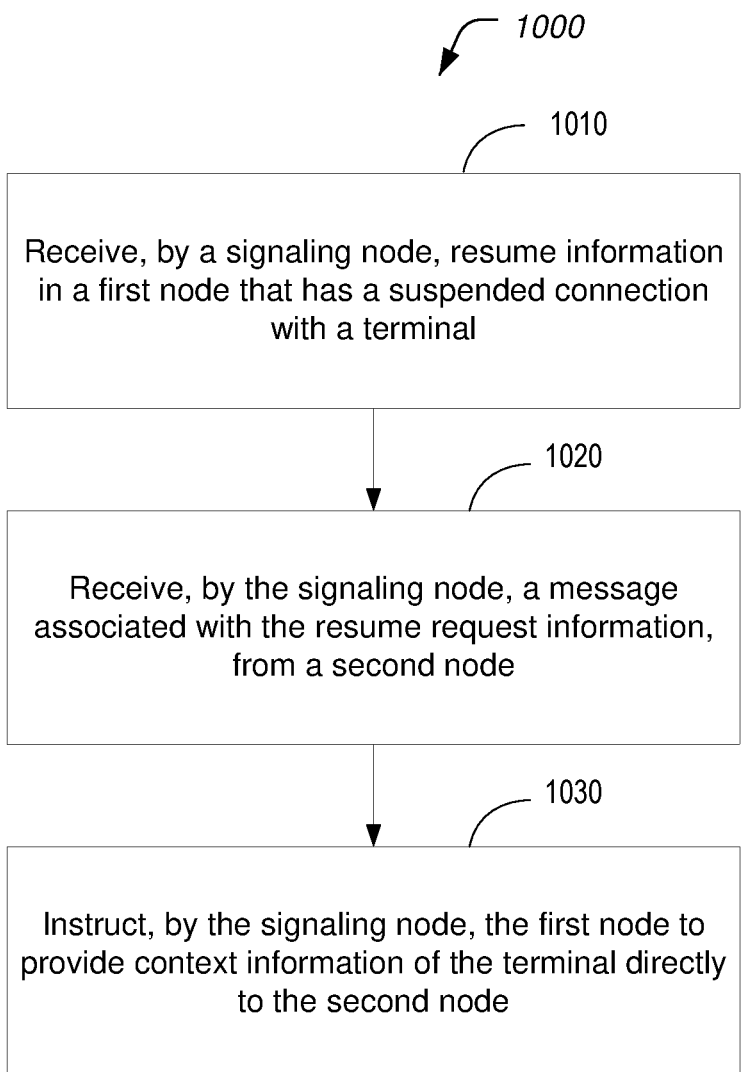
FIG. 10 is a flow diagram illustrating an example of a wireless communication method based on some embodiments of the disclosed technology.

FIG. 10 is a flow diagram illustrating an example of a wireless communication method based on some embodiments of the disclosed technology. The wireless communication method 1000 includes, at step 1010, receiving, by a signaling node, resume information in a first node that has a suspended connection with a terminal, at step 1020, receiving, by the signaling node, a message associated with the resume request information, from a second node, and, at step 1030, instructing, by the signaling node, the first node to provide context information of the terminal directly to the second node.

The wireless communication method 1000 may further include receiving, by the signaling node, a context suspend request for the terminal, including an identification that identifies context information associated with the terminal. The wireless communication method 1000 may further include receiving, by the signaling node, a context suspend request for the terminal, including an identification of the first node. The wireless communication method 1000 may further include receiving, by the signaling node, a context suspend request for the terminal, including an identification of the terminal. The wireless communication method 1000 may further include receiving, by the signaling node, a context suspend request for the terminal, including security information for the first node to determine whether the second node is reliable. The wireless communication method 1000 may further include receiving, by the signaling node, a context suspend request for the terminal, including a mobile-terminated early data transmission security context.

In some implementations, the message associated with the resume request information includes an identification of the terminal. In some implementations, the message used by the signaling node for instructing the first node to provide context information to the second node includes an identification of the second node, and/or an identification of the terminal. In some implementations, the signaling node includes a mobility management entity (MME). In some implementations, each of the first and second nodes include an evolved node B (eNB).

FIG. 11 is a flow diagram illustrating another example of a wireless communication method based on some embodiments of the disclosed technology. The wireless communication method 1100 includes, at step 1110, sending, by a signaling node, a paging message to a second node, at step 1120, receiving, by a second node, an access request from a terminal, at step 1130, receiving, by the signaling node, from the second node, a message for requesting context information of the terminal, via an application protocol provided between a radio access network and a core network, and, at step 1140, instructing the second node to obtain a context response associated with the terminal from the first node or the signaling node.

The wireless communication method 1100 may further include sending, by the signaling node, to the first node, a message to trigger transferring context information of the terminal. In some implementations, the message to trigger transferring context information of the terminal includes an identification of the terminal. In some implementations, the message to trigger transferring context information of the terminal is provided via the application protocol provided between the radio access network and the core network. The wireless communication method 1100 may further include causing the first node to send a message for the context response associated with the terminal directly to the second node. In some implementations, the message is sent via an application protocol provided between the first and second nodes. The wireless communication method 1100 may further include causing the first node to send a message for the context response associated with the terminal to the signaling node so that the second node receives the context response associated with the terminal directly from the signaling node. In some implementations, the message is sent via the application protocol provided between the radio access network and the core network. The wireless communication method 1100 may further include sending, by the signaling node, to the second node, a message for responding context information of the terminal, via an application protocol provided between a radio access network and a core network. The wireless communication method 1100 may further include receiving, by the signaling node, before sending the paging message to the second node, a context suspend request for the terminal, from the first node. In some implementations, the signaling node includes a mobility management entity (MME). In some implementations, each of the first and second nodes include an evolved node B (eNB).

Figure 12:
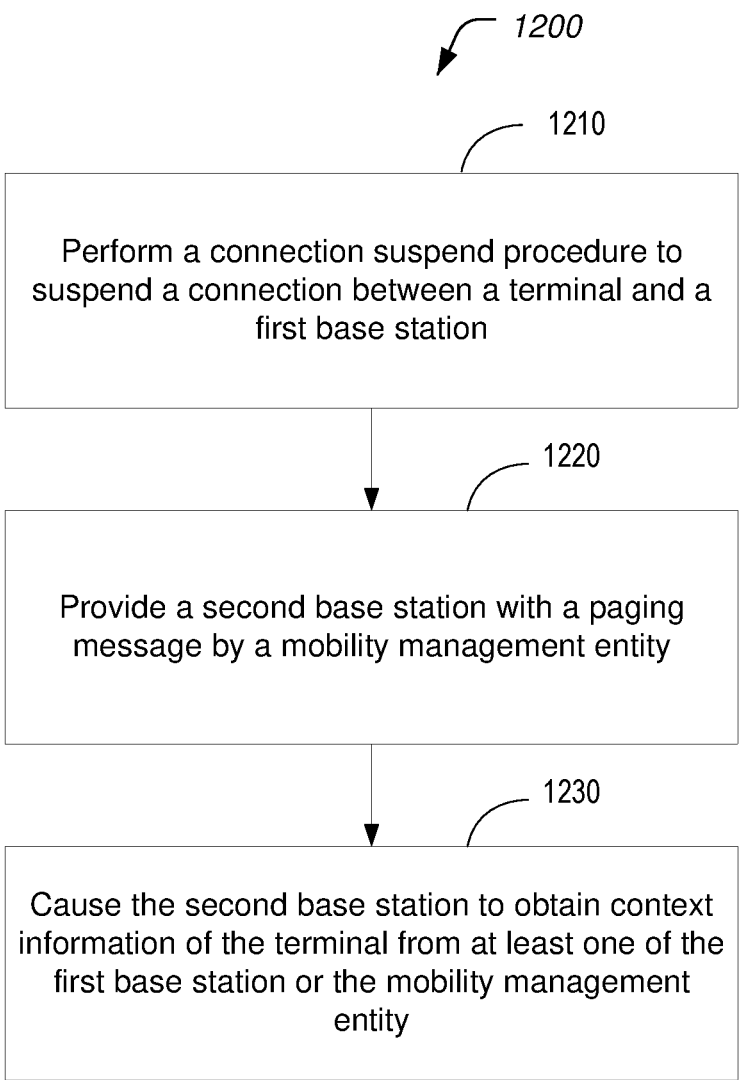
FIG. 12 is a flow diagram illustrating another example of a wireless communication method based on some embodiments of the disclosed technology.

FIG. 12 is a flow diagram illustrating another example of a wireless communication method based on some embodiments of the disclosed technology. The wireless communication method 1200 includes, at step 1210, performing a connection suspend procedure to suspend a connection between a terminal and a first base station, at step 1220, providing a second base station with a paging message by a mobility management entity, and, at step 1230, causing the second base station to obtain context information of the UE from at least one of the first base station or the mobility management entity.

In some implementations, the causing the second base station to obtain context information of the terminal includes indirectly identifying the context information of the terminal using a base station core network interface identifier assigned by the first base station to the terminal during the connection of the terminal with the first base station. In some implementations, the indirectly identifying the context information of the terminal includes triggering an inter-base station terminal context retrieval procedure the base station core network interface identifier assigned by the first base station to the terminal.

The wireless communication method 1200 may further include providing the second base station with a message for a terminal context request, providing the mobility management entity with a message for triggering a terminal context transfer, and providing the second base station with a message for a terminal context response. The wireless communication method 1200 may further include providing the mobility management entity with a message for a terminal context request, providing the first base station with a message for triggering a terminal context transfer, providing the mobility management entity with a message for a terminal context transfer response, and providing the second base station with a message for a terminal context response. In some implementations, the performing the connection suspend procedure to suspend the connection of the terminal with the first base station includes providing the mobility management entity with a message for a terminal context suspend request. The wireless communication method 1200 may further include providing the mobility management entity with a message for a terminal context request, and providing the second base station with a message for a UE context response.

In some implementations, the causing the second base station to obtain context information of the terminal includes passing the context information of the terminal to the second base station using an inter-base station handover procedure. The wireless communication method 1200 may further include providing the mobility management entity with a message for a terminal context request, providing the first base station with a message for triggering a terminal context transfer, providing the second base station with a handover request, and providing the mobility management entity with a message for a handover request acknowledgement.

Figure 13:
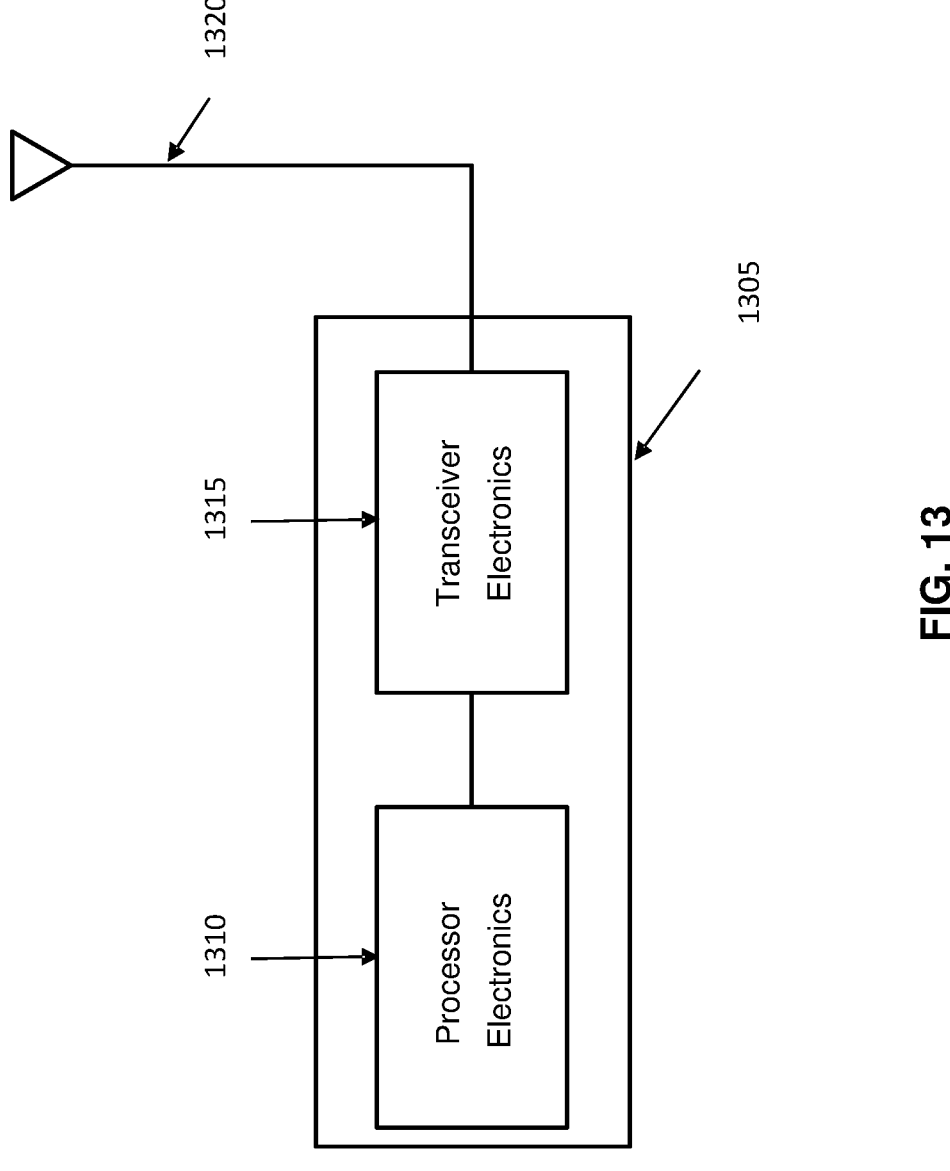
FIG. 13 is a block diagram representation of a portion of a radio station in accordance with one or more embodiments of the present technology can be applied.

FIG. 13 is a block diagram representation of a portion of a radio station in accordance with one or more embodiments of the present technology can be applied. A radio station 1305 such as a base station or a wireless device (or UE) can include processor electronics 1310 such as a microprocessor that implements one or more of the wireless techniques that presented in this document. The radio station 1305 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   storing, by a signaling node, context information of a terminal in response to receiving, from a first base station, a context suspend request for the terminal that includes the context information of the terminal;
   sending, by the signaling node, a paging message to a second base station;

causing the second base station to receive an access request from the terminal;

receiving, by the signaling node, from the second base station, a message for requesting context information of the terminal;

sending, by the signaling node, to the first base station, a message that includes an identification of the terminal to trigger transferring the context information of the terminal;

causing the first base station to send a message for the context information associated with the terminal to the signaling node so that the second base station receives the context information associated with the terminal directly from the signaling node or causing the first base station to send a message for the context information associated with the terminal directly to the second base station.

2. A method for wireless communication, comprising:

sending, by a signaling node, a paging message to a second base station;

causing the second base station to receive an access request from a terminal;

receiving, by the signaling node, from the second base station, a message for requesting context information of the terminal;

instructing the second base station to obtain context information associated with the terminal, wherein the second base station receives the context information directly from a first base station through an X2 interface between the first base station and the second base station or from the signaling node;

sending, by the signaling node, to the first base station, a message that includes an identification of the terminal to trigger transferring context information of the terminal; and causing the first base station to send a message for the context information associated with the terminal to the signaling node so that the second base station receives the context information associated with the terminal directly from the signaling node.

3. The method of claim 2, further comprising:

sending, by the signaling node, to the second base station, a message for responding context information of the terminal, via an application protocol provided between a radio access network and a core network.

4. The method of claim 2, further comprising:

receiving, by the signaling node, before sending the paging message to the second base station, a context suspend request for the terminal, from the first base station.

5. The method of claim 2, wherein the signaling node includes a mobility management entity (MME), and each of the first and second base stations includes an evolved node B (eNB).

6. A method for wireless communication, comprising:

performing a connection suspend procedure to suspend a connection between a terminal and a first base station;

providing a second base station with a paging message by a signaling node;

receiving, by a signaling node, from the second base station, a message for requesting context information of the terminal; and causing, by the signaling node, the second base station to obtain context information of the terminal, wherein the second base station receives the context information of the terminal from at least one of the first base station or the signaling node, wherein the second base station receives the context information of the terminal directly from the first base station through an X2 interface between the first base station and the second base station, wherein the causing the second base station to obtain context information of the terminal includes indirectly identifying the context information of the terminal using a base station core network interface identifier assigned by the first base station to the terminal during the connection of the terminal with the first base station.

7. The method of claim 6, further comprising:

providing the second base station with a message for a terminal context request;

providing the signaling node with a message for triggering a terminal context transfer; and providing the second base station with a message for a terminal context response.

8. The method of claim 6, further comprising:

providing the signaling node with a message for a terminal context request;

providing the first base station with a message for triggering a terminal context transfer;

providing the signaling node with a message for a terminal context transfer response; and providing the second base station with a message for a terminal context response.

9. The method of claim 6, wherein the performing the connection suspend procedure includes providing the signaling node with a message for a terminal context suspend request.

10. The method of claim 9, further comprising:

providing the signaling node with a message for a terminal context request; and providing the second base station with a message for a terminal context response.

11. The method of claim 6, wherein the causing the second base station to obtain context information of the terminal includes passing the context information of the terminal to the second base station using an inter-base station handover procedure.

12. The method of claim 11, further comprising:

providing the signaling node with a message for a terminal context request;

providing the first base station with a message for triggering a terminal context transfer;

providing the second base station with a handover request; and providing the signaling node with a message for a handover request acknowledgement.

13. The method of claim 1, wherein the stored context information of the terminal is sent via an application protocol.

14. The method of claim 1, wherein the signaling node includes a mobility management entity (MME), and each of the first and second base stations includes an evolved node B (eNB).

15. The method of claim 6, wherein the signaling node includes a mobility management entity (MME), and each of the first and second base stations includes an evolved node B (eNB).

16. An apparatus for wireless communication, comprising a memory and at least one processor, wherein the at least one processor reads code from the memory and cause the apparatus to implement the method recited in claim 1.

17. An apparatus for wireless communication, comprising a memory and at least one processor, wherein the at least one processor reads code from the memory and cause the apparatus to implement the method recited in claim 2.

18. An apparatus for wireless communication, comprising a memory and at least one processor, wherein the at least one processor reads code from the memory and cause the apparatus to implement the method recited in claim 6.

19. A method for wireless communication, comprising:

storing, by a signaling node, context information of a terminal in response to receiving, from a first base station, a context suspend request for the terminal that includes the context information of the terminal;

sending, by the signaling node, a paging message to a second base station;

causing the second base station to receive an access request from a terminal;

receiving, by the signaling node, from the second base station, a message for requesting context information of the terminal;

sending, by the signaling node, to the first base station, a message that includes an identification of the terminal to trigger transferring context information of the terminal;

causing the first base station to send a message for the context information associated with the terminal directly to the second base station.

* * * * *